(12) United States Patent
Zadravec

(10) Patent No.: US 6,330,056 B1
(45) Date of Patent: Dec. 11, 2001

(54) LASER TELEMETER

(75) Inventor: Dusan Zadravec, Rebstein (CH)

(73) Assignee: Leica Geosystems AG, Heerbrugg (CH)

( * ) Notice: Subject to any disclaimer, the term of this patent is extended or adjusted under 35 U.S.C. 154(b) by 0 days.

(21) Appl. No.: 09/346,904

(22) Filed: Jul. 2, 1999

(30) Foreign Application Priority Data

Jul. 2, 1998 (DE) ............................................. 198 29 659

(51) Int. Cl.[7] ................... G01C 3/08; G01P 3/36
(52) U.S. Cl. ............................ 356/4.01; 356/28.5
(58) Field of Search ......................... 356/4.01–5.15, 356/28.5, 28

(56) References Cited

U.S. PATENT DOCUMENTS 4,733,961 * 3/1988 Mooney .
5,221,956 * 6/1993 Patterson et al. .
5,552,879 * 9/1996 Takamiya et al. .................. 356/28.5

FOREIGN PATENT DOCUMENTS

| 37 04 848 A1 | 3/1988 | (DE) . |
| 41 35 615 A1 | 5/1993 | (DE) . |
| 198 29 659 C1 | 7/1998 | (DE) . |

* cited by examiner

*Primary Examiner*—Stephen C. Buczinski
(74) *Attorney, Agent, or Firm*—Foley & Lardner

(57) ABSTRACT

A laser telemeter having separate transmitting and receiving optical systems, and at least monocular target observation, in which a telescope optical system (5, 6) which is inserted before the transmitting optical system (2) and reduces the divergence of the transmitted beam, a telescope optical system (7, 8) which is inserted before the receiving optical system (3) and has an aperture angle adapted to the divergence of the transmitted beam and a common support frame (9) for the telescope optical systems (5, 6; 7, 8) which can be coupled at the front with the housing (10) of the laser telemeter (1) are provided.

4 Claims, 2 Drawing Sheets

LASER TELEMETER

BACKGROUND OF THE INVENTION

1. Field of the Invention

The invention relates to a laser telemeter having separate transmitting and receiving optical systems, and at least monocular target observation.

2. Description of the Related Art

The majority of the known laser telemeters are based on the following principle. A collimated laser beam is produced and is directed via a transmitting optical system at a remote target. The laser light reflected by the target is picked up by the receiving optical system and fed to a detector. The receiving optical system is usually also used for target observation. Such a device is disclosed, for example, in German Publication DE 41 35 615 A1. A binocular observation device with a laser telemeter is disclosed in German Publication DE 37 04 848 A1.

Particularly in the case of small targets, it is necessary to collimate the laser beam well. It is desirable for the distance-dependent size of the laser spot to be smaller than the cross-section of the target to be measured, in order both to achieve very high laser light intensity on the target and to selectively influence the transmitted beam by the target to be measured.

The optical parameters of the transmitting optical system determine the divergence of the transmitted beam. The intensity of the laser light arriving at the detector and reflected by the target depends on the optical parameters of the receiving optical system, essentially on its diameter. The optical parameters of the transmitting and receiving optical systems therefore directly influence the maximum range of the laser telemeter.

An increase in the range can be achieved either by increasing the laser power or by making the transmitting and receiving optical systems larger. The maximum laser power is limited on the one hand by regulations relating to safety for the eyes and moreover by the capacity of the energy source for operating the laser. The disadvantages of increasing the dimensions of the optical systems are the associated inconvenience of handling and greater weight.

The technical complexities associated with a larger range have led to the development and optimization of specially designed laser telemeters for different ranges. The users of such devices must therefore decide on different devices depending on the measuring range required and may have to acquire several devices.

The readiness of the devices for use additionally depends on the weather conditions, which may hinder the transmission of the optical radiation. A device designed for relatively long ranges may, under unfavorable circumstances therefore, also be used for shorter distances at which the device designed for these ranges has failed. However, the disadvantage is that only the limited field of view designed for more remote targets is constantly available for the target observation. In case of doubt, the users will nevertheless have to decide in favor of the technically more complex, and therefore more expensive, device.

SUMMARY OF THE INVENTION

It is therefore an object of the invention to provide a laser telemeter which permits the range to be increased in an economical manner, especially for small targets, without substantially impairing the convenience of handling and safety for the eyes.

This object is achieved, according to the invention, by a laser telemeter comprising a transmitting optical system; a receiving optical system; a target observation system; a first telescope optical system before the transmitting optical system; and a second telescope optical system before the receiving optical system. The first telescope optical system reduces divergence of a transmitted beam. The second telescope optical system has an aperture angle adapted to divergence of said transmitted beam The laser telemeter according to the invention may have a numerical aperture of each of the first and second telescope optical systems adapted in each case to a respective transmitting or receiving optical system.

The magnification of the first and second telescope optical systems may be the same.

The laser telemeter may further comprise a common support frame for the first and second telescope optical systems coupled to the laser telemeter.

The target observation system may be monocular or binocular.

Each telescope optical system may further comprise either a positive lens on an object side and a negative lens on an image side or, alternatively, a positive lens on each side.

DESCRIPTIONS OF THE PREFERRED EMBODIMENTS

Figure 1:
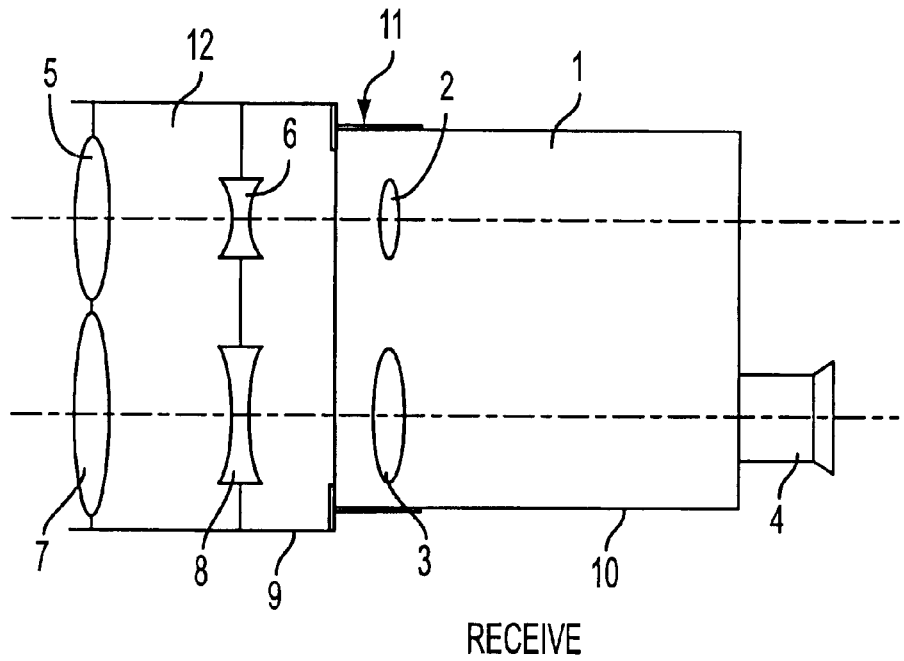
FIG. 1 shows an embodiment of the present invention with a monocular laser telemeter.

The invention has also been disclosed in related German patent application No. 198 29 659.2, filed Jul. 2, 1998, which is hereby incorporated by reference.

In the drawings, embodiments of the laser telemeter according to the invention are shown schematically. They are described in more detail below with reference to the Figures.

The invention starts from a basic configuration of a laser telemeter and, if required, increases the range by means of a telescope optical system which can be inserted. Although such a telescope optical system is known per se from "Die Fernrohre und Entfernungsmesser" [The telescopes and telemeters], Dr. A. König, (1937), page 95, it is discussed there only from the point of view of a change in magnification. The positive effects on the intensity balance in the transmitted and received beam are not directly evident. However, these are of decisive importance for an increase in the range, in particular in the case of small targets. Although the change in magnification on sighting relatively remote targets is an advantageous secondary effect, it however appears only to affect the target observation with the laser telemeter.

FIG. 1 shows the fundamental structure of a laser telemeter 1 having a transmitting optical system 2 and a separate receiving optical system 3, and monocular target observation system comprising an eyepiece 4 and associated optics. The receiving optical system 3 also receives light for target observation via the target observation system comprising the eyepiece 4 and associated optics. By means of suitable beam dividers which are not shown, it is ensured that the laser beam does not enter the eyepiece 4.

The inserted telescopic system 12, comprising optical systems 5, 6, 7, 8, is arranged within a common support frame 9 which can be coupled with the housing 10 of the laser telemeter 1. In the embodiments shown in FIG. 1 and 2, the support frame 9 is pushed onto the housing 10 at overlap 11. Other possibilities for detachable fastening are within the capabilities of a person skilled in the art, such as attachment bracket 13 shown in FIG. 3.

As discussed below, the image magnification of the telescope optical system 5, 6 before the transmitting optical system 2 differs from that of the telescope optical systems 7, 8 before the receiving optical system 3 in order to achieve optimal adaptation to the optical parameters of the basic device. The apertures of the two optical systems 2, 3 are likewise tailored to one another. This leads to different geometric dimensions of the telescope optical systems. The calculation of the optical parameters is within the customary capabilities of a person skilled in the art.

The effect of the telescope optical system 5, 6 before the transmitting optical system 2 is to increase the energy density at the target by the reduced divergence of the transmitted beam. The increase in the light intensity due to the telescope optical system 5, 6 is proportional to the square of the telescopic magnification for the same numerical aperture of the combined transmitting system. In practice, this means that virtually the same reflected light intensity will be received by the more remote target as by the closer target without the telescope optical system 5, 6. The reflected intensity decreases as the square of the distance from the target, and this decreasing is compensated by the effect of the telescope optical system 5, 6.

The telescope optical system 7, 8 before the receiving optical system 3 has the same effect as an increase in the diameter of the optical elements and thus increases the intensity of reflected laser radiation picked up. In practice, this measure means an increase in the distance range by about the square root of the telescopic magnification for small targets and by about the telescopic magnification of large targets.

If the telescopic magnification before the transmitting optical system 2 and before the receiving optical system 3 are chosen to be of the same magnitude, the change in the divergence of the transmitted beam in conjunction with the change in the field of view of the receiving optical system 3 then result overall in no change relative to the transmitting/receiving conditions of the basic device without a telescope optical system. The range increase achieved according to the invention is equal to the product of the magnitudes of the telescopic magnification of the transmitting optical system 2 and receiving optical system 3.

If the telescopic magnification in the two optical systems is chosen to be of the same magnitude, the mutual orientation of the optical axes of the basic device and of the inserted telescope optical system 5, 6, 7, 8 is not critical. Even small angular deviations between the optical axes do not influence the increase in the range.

Instead of the Galilean type shown, with positive lenses 5, 7 on the object side and negative lenses 6, 8 on the image side, an image reversal system comprising two positive lenses may also be chosen.

Figure 2:
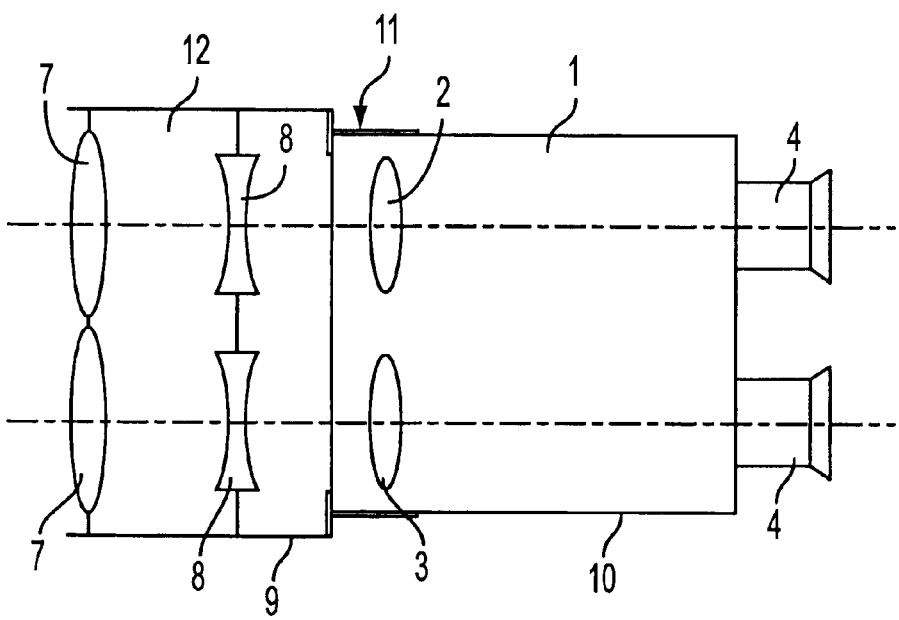
FIG. 2 shows an embodiment of the present invention with a binocular laser telemeter.

FIG. 2 shows the basic structure of a binocular system. Since the transmitting optical system 2 and the receiving optical system 3 of the basic device are identical, it is also possible to use identically designed telescope optical systems 7, 8.

As already mentioned, tolerances in the alignment and in the inclination are permitted within narrow limits in the orientation of the optical axes of the telescope optical system with those of the transmitting and receiving optical system. The mechanical coupling of the support frame to the housing of the basic device therefore need not meet high requirements.

Figure 3B:
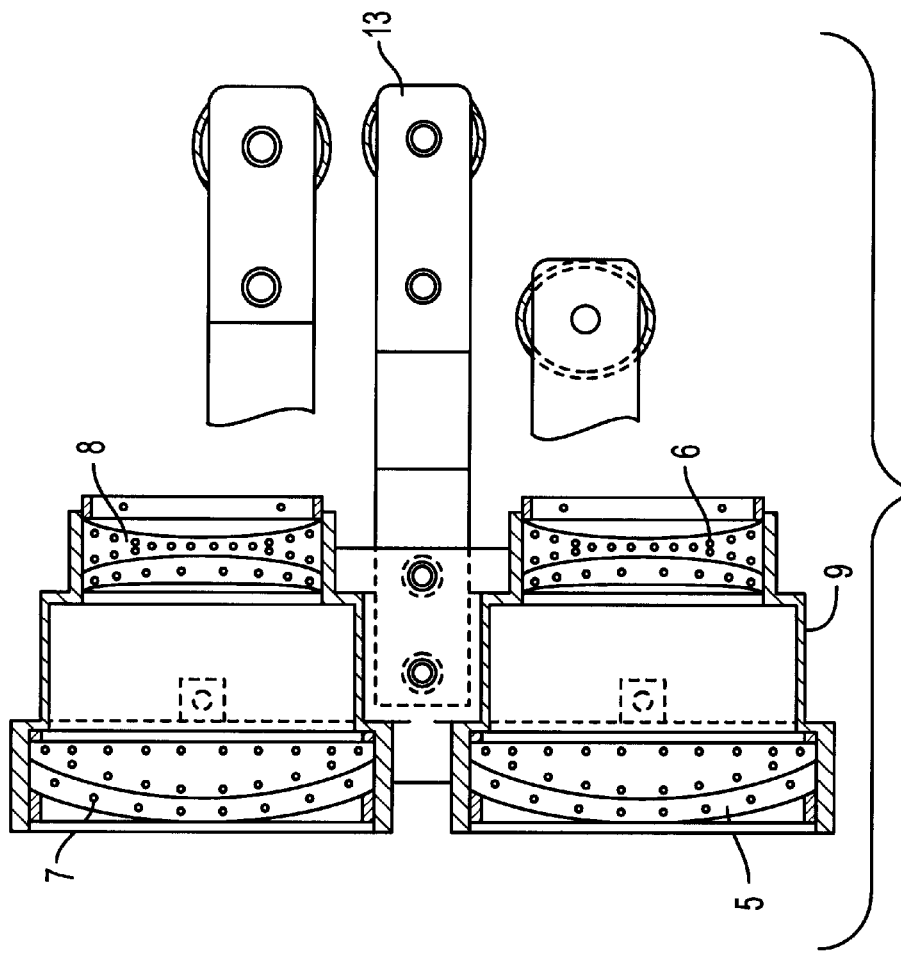
FIGS. 3a and 3b show a specific implementation of the laser telemeter according to the present invention.
Figure 3A:
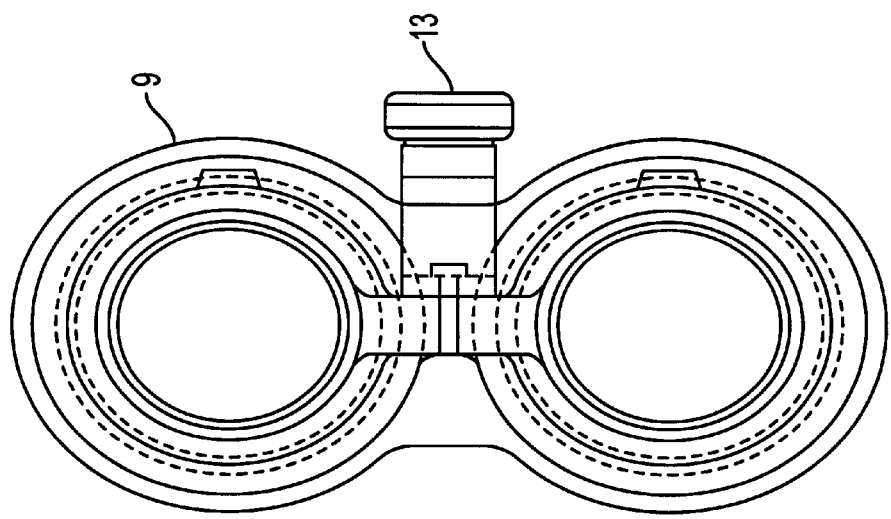

The FIGS. 3a and 3b provides details of one specific implementation of the invention. The invention, of course, is not limited to the design set forth in FIGS. 3a and 3b. In this implementation, lens 7 (cemented component) has a free diameter of 60 mm, while negative lens 8 (cemented component) has a free diameter of 42 mm. The focal distance attachment is an afocal system. A 1.43× magnification attachment is provided. In this implementation, lens 3 has a free diameter of 42 mm and a focal distance of 172.3 mm.

While preferred embodiments have been described herein, modifications of the described embodiments may become apparent to those of ordinary skill in the art, following the teachings of the invention, without departing from the spirit and scope of the invention as set forth in the appended claims.

What is claimed is:

1. A laser range-finder binoculars system for measuring a range between a target and the binoculars system comprising:
   a laser range-finding binoculars, comprising
      a first housing,
      a visible light target observation first telescope system fixed to said first housing comprising a first objective lens and having a magnification,
      a visible light target observation second telescope system fixed to said first housing comprising a second objective lens and having said magnification,
      a transmitting optical system fixed to said first housing comprising said first objective lens for transmitting an infrared laser beam having a divergence, and
      a receiving optical system comprising said second objective lens having an aperture angle adapted to said divergence of said infrared laser beam; and
   a range increasing optical attachment system, comprising
      a second housing,
      a quick-attachment mechanism coupled to said second housing configured to permit an operator to quickly attach said second housing to said first housing and to quickly detach said second housing from said first housing,
      a third telescope system fixed to said second housing so as to be placed in front of said first objective lens when said range increasing optical attachment system is attached to said first housing, said third telescope system configured to reduce said divergence of said infrared laser beam and increase said magnification of said visible light target observation first telescope system, and
      a fourth telescope system fixed to said second housing so as to be placed in front of said second objective lens when said range increasing optical attachment system is attached to said first housing, said fourth telescope system configured to reduce said aperture angle and to increase said magnification of said visible light target observation second telescope system.

2. A laser range-finders binoculars according to claim 1, wherein said third telescope system and said forth telescope system are identical.

3. A range-increasing optical system for removable quick attachment in front of a laser range-finder binoculars system for measuring the range between a target and the rangefinder binocular system, wherein the binoculars comprise a first housing, a visible light target observation first telescope system fixed to said first housing comprising a first objective lens and having a magnification, a visible light target observation second telescope system fixed to said first housing comprising a second objective lens and having a second magnification, a transmitting optical system fixed to said first housing comprising said first objective lens for transmitting an infrared laser beam having a divergence, and a receiver optical system fixed to said first housing comprising said second objective lens having an aperture angle adapted to said divergence of said infrared laser beam, said range-increasing optical system comprising:

a support frame including a quick attachment mechanism configured to enable an operator to quickly attach said support frame to said first housing and to quickly detach said support frame from said first housing;

a third telescope system fixed to said support frame so as to be placed in front of said first objective lens when said support frame is attached to said first housing, said third telescope system configured to reduce said divergence of said infrared laser beam and to increase said magnification of said target observation first telescope system; and a fourth telescope system fixed to said support frame so as to be placed in front of said second objective lens when said support frame is attached to said first housing, said fourth telescope system configured to reduce said aperture angle and to increase said magnification of said target observation second telescope system.

4. A range increasing optical system according to claim 3, wherein said third telescope system and said forth telescope system are identical.

* * * * *